Dec. 15, 1964   J. S. GOLIGHTLY ETAL   3,161,493
APPARATUS FOR BENDING GLASS SHEETS
TO COMPOUND CURVATURES
Original Filed Aug. 30, 1955   11 Sheets-Sheet 1

INVENTORS
JAMES S. GOLIGHTLY
DAVID H. DOEHLERT and
BY CHARLES R. DAVIDSON, JR

Oscar Spencer
ATTORNEY

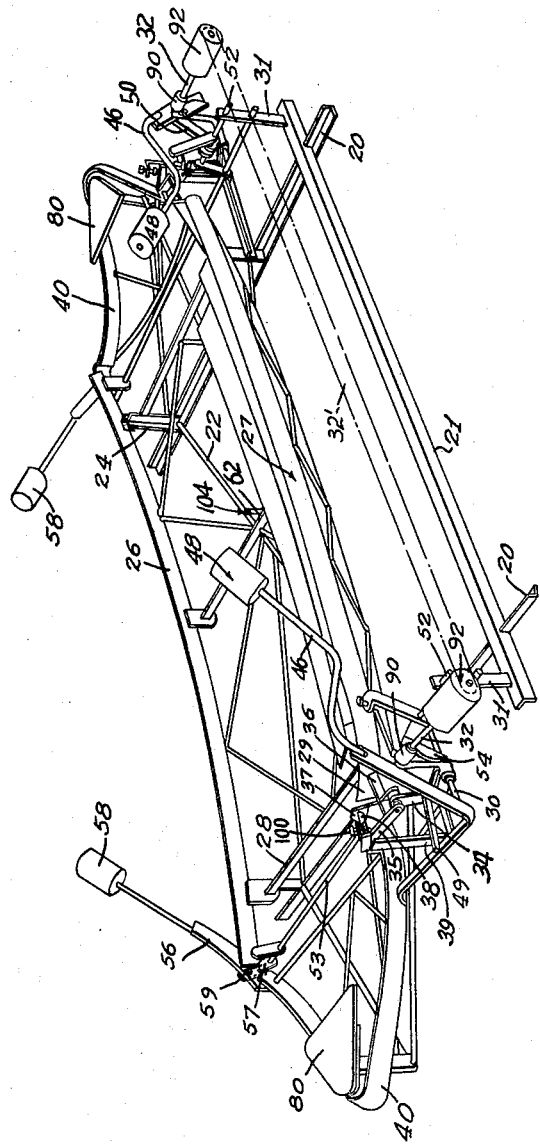

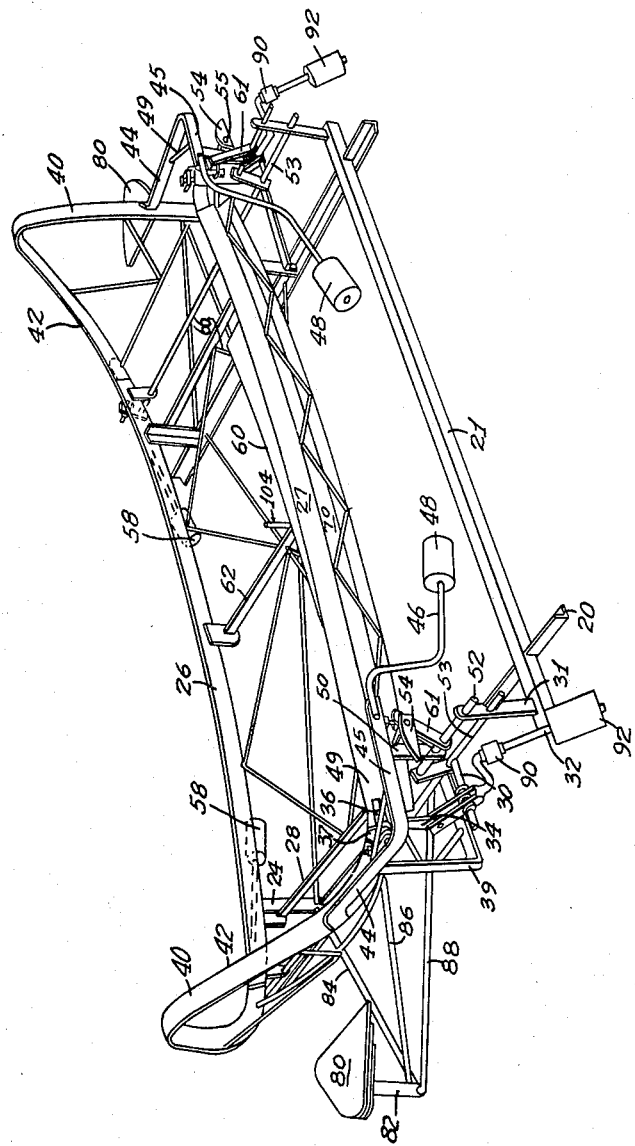

Dec. 15, 1964   J. S. GOLIGHTLY ETAL   3,161,493
APPARATUS FOR BENDING GLASS SHEETS
TO COMPOUND CURVATURES
Original Filed Aug. 30, 1955   11 Sheets-Sheet 4

INVENTORS
JAMES S. GOLIGHTLY
DAVID H. DOEHLERT and
BY CHARLES R. DAVIDSON JR.

Oscar Spencer
ATTORNEY

Dec. 15, 1964  J. S. GOLIGHTLY ETAL  3,161,493
APPARATUS FOR BENDING GLASS SHEETS
TO COMPOUND CURVATURES
Original Filed Aug. 30, 1955  11 Sheets-Sheet 5
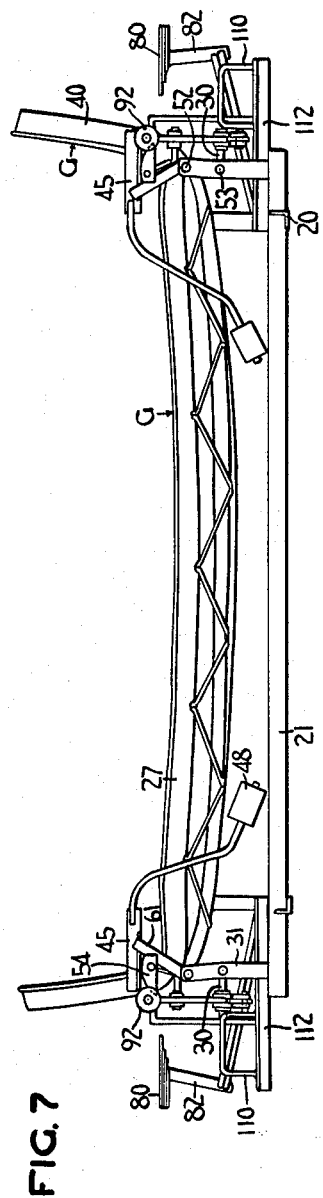
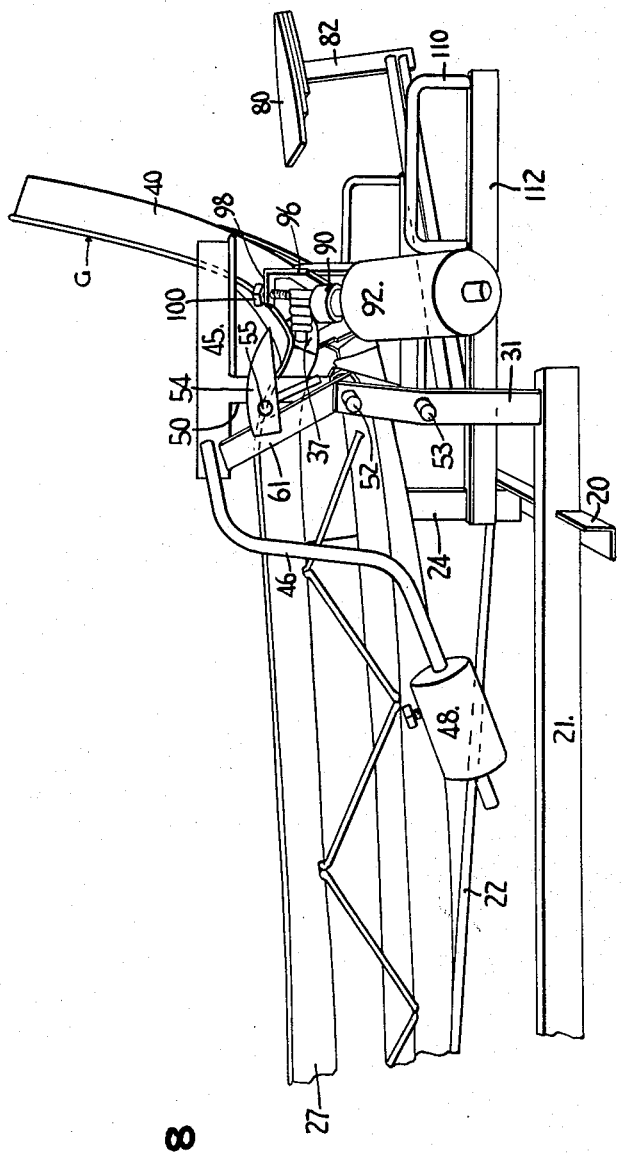
INVENTORS
JAMES S. GOLIGHTLY
DAVID H. DOEHLERT and
BY CHARLES R. DAVIDSON, JR.
Oscar B. Spencer
ATTORNEY

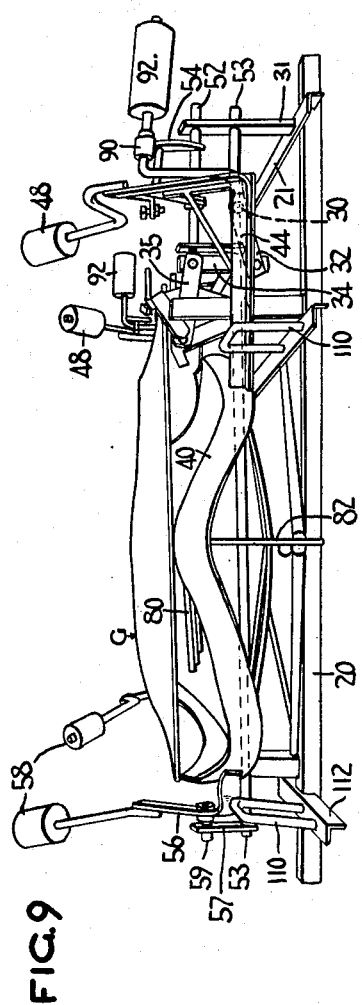
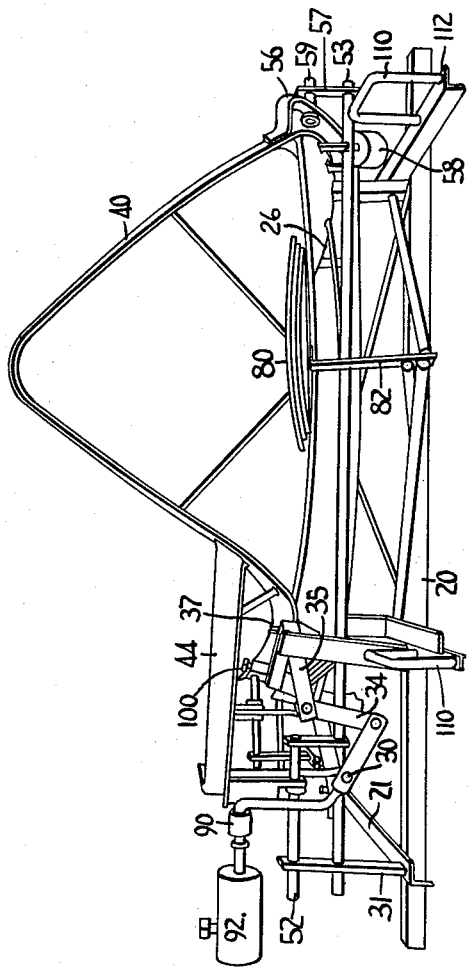

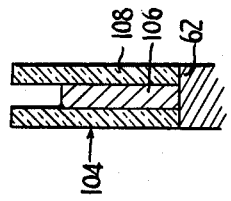
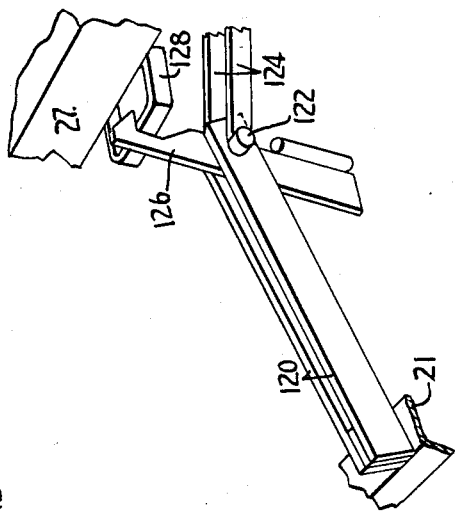
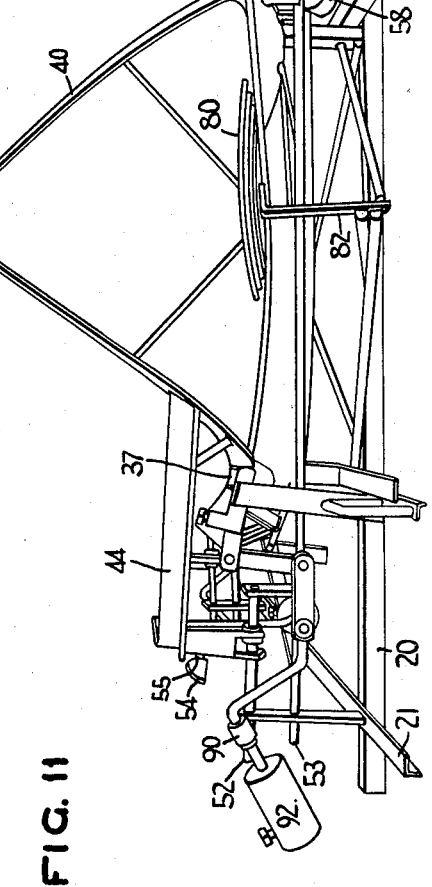
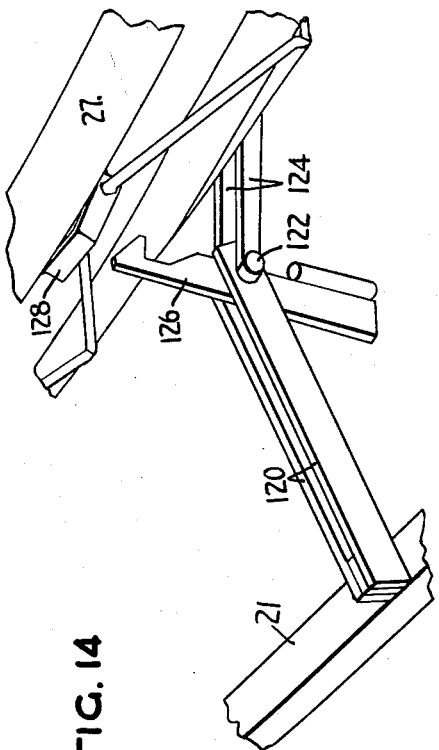
INVENTORS
JAMES S. GOLIGHTLY
DAVID H. DOEHLERT and
BY CHARLES R. DAVIDSON, JR.
Oscar H. Spencer
ATTORNEY

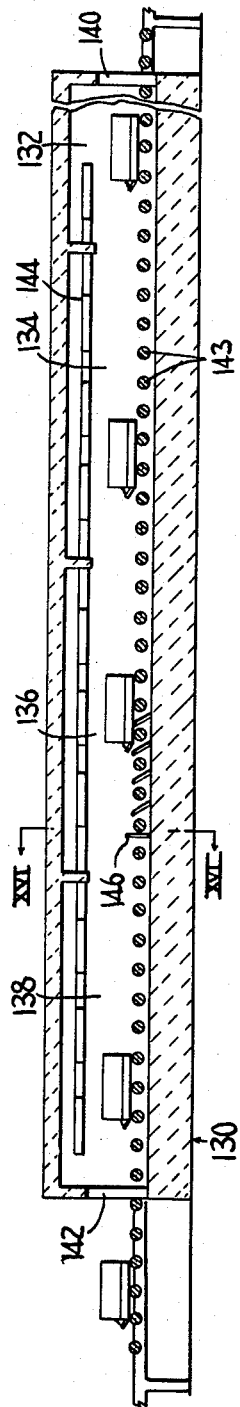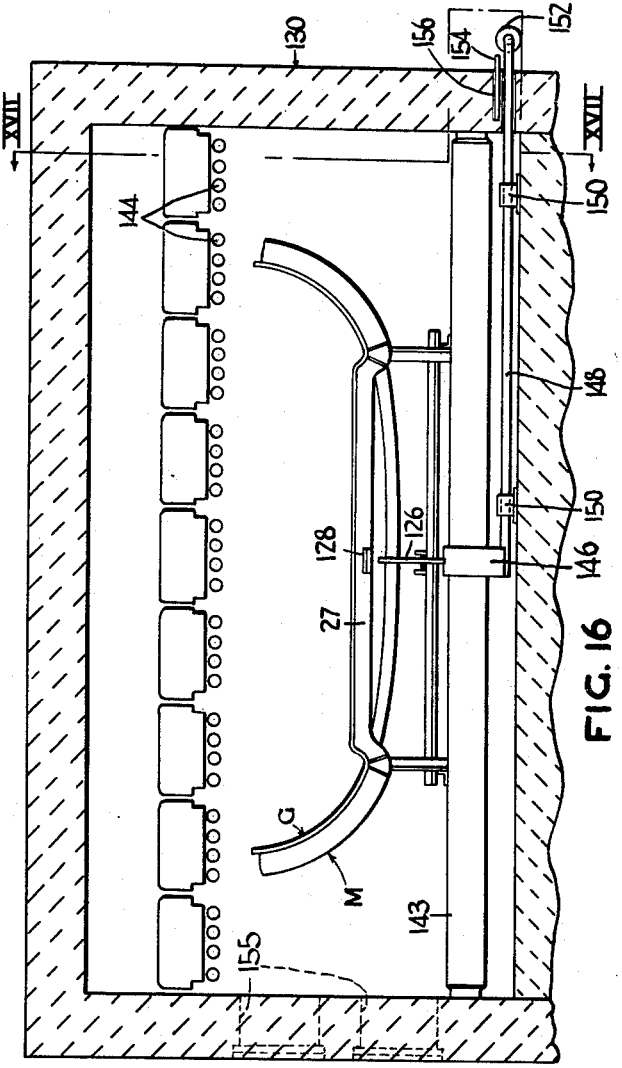

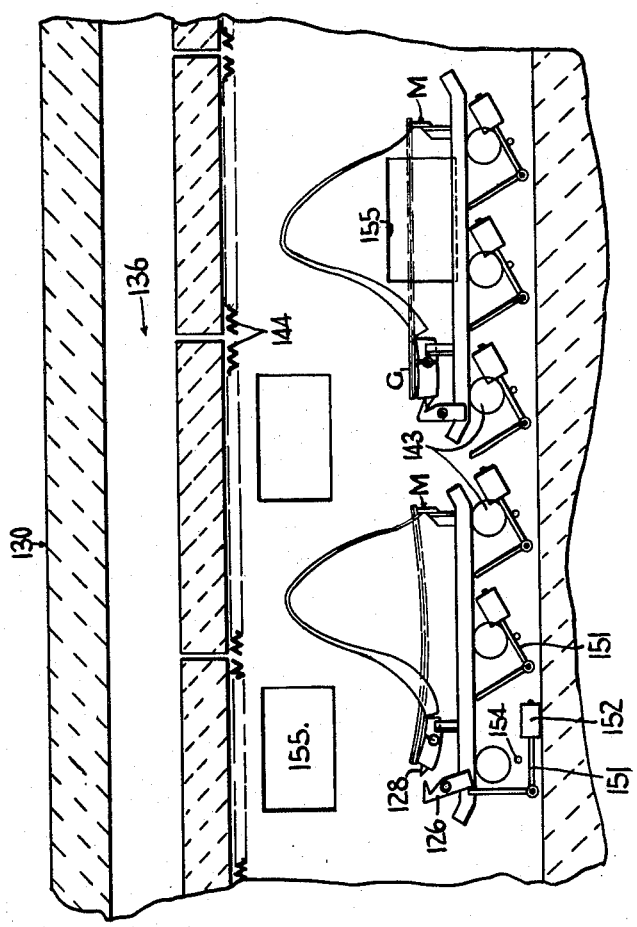

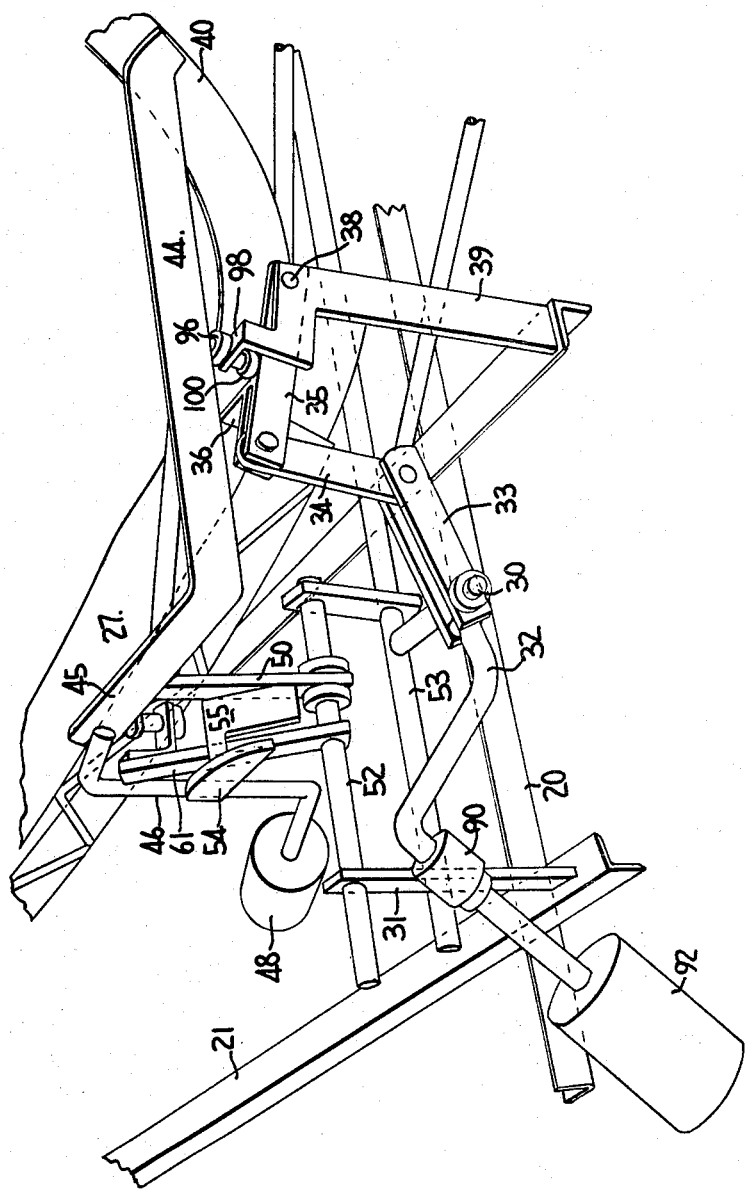

Dec. 15, 1964 J. S. GOLIGHTLY ETAL 3,161,493
APPARATUS FOR BENDING GLASS SHEETS
TO COMPOUND CURVATURES
Original Filed Aug. 30, 1955 11 Sheets-Sheet 11

INVENTORS
JAMES S. GOLIGHTLY
DAVID H. DOEHLERT and
BY CHARLES R. DAVIDSON JR

Oscar h Spencer
ATTORNEY

United States Patent Office 3,161,493
Patented Dec. 15, 1964

3,161,493
APPARATUS FOR BENDING GLASS SHEETS TO COMPOUND CURVATURES
James S. Golightly, Fox Chapel, Pittsburgh, Pa., David H. Dochlert, Newark, Del., and Charles R. Davidson, Jr., Tarentum, Pa., assignors to Pittsburgh Plate Glass Company, Pittsburgh, Pa., a corporation of Pennsylvania
Continuation of application Ser. No. 531,461, Aug. 30, 1955. This application Feb. 24, 1961, Ser. No. 91,476
15 Claims. (Cl. 65—158)

This application relates to apparatus for bending glass sheets to compound curvatures. Specifically, the present invention relates to an apparatus for providing the compound curvature to flat glass sheets necessary to bend the sheets into a configuration acceptable for the latest designs in vehicle glazing panels such as automotive windshields and backlights. Such designs require that the panels extend continuously from one side completely across the vehicle into the other side and include an additional auxiliary portion extending transversely of the longitudinal axis of the panel into the roof of the vehicle.

In order to bend glass sheets into two mutually perpendicular directions along axes having varying radii, many difficulties are encountered. Glass must be stretched unevenly during the bending operation, thereby causing optical distortion. In order to stretch glass in two mutually perpendicular directions, additional distortion is bound to occur. Furthermore, difficulties are encountered in reproducing such compound bends, especially when the windshields are produced at mass production rates.

When longitudinal and transverse bends are imparted to glass sheets in a noncontinuous operation, such a process is too slow for mass production. It is far superior to perform the bending operation by a continuous process wherein flat glass sheets are mounted on a bending mold, conveyed continuously through a bending lehr and removed from the lehr in the compound shape desired. The present invention provides novel mold and lehr structure capable of accomplishing the complex longitudinal bend and the complex transverse bend required for compound windshields independently of each other, thus minimizing the resultant distortion and problems of reproducing the manufactured articles at high rates of production within the small tolerances permitted by automobile manufacturers.

Typical bending molds employed in the present invention include a longitudinally extending center section comprising two spaced, longitudinally extending rails and outboard sections rotatable into one position for receiving flat glass sheets and into another position to provide with the central section a substantially continuous outline conforming in elevation and curvature to the outline desired for the bent glass sheets. In an illustrative mold employing the present invention, the center section of the mold is modified so that at least a portion of one of the center section rails is made rotatable relative to the other longitudinally extending rail.

In a particularly efficient modification of the present invention, the rotatable rail of the center section is counterweighted for rotation about an axis substantially parallel to the longitudinal axis of the mold. The outboard sections are counterweighted about spaced axes extending angularly relative to the first axis of rotation. In adidtion, means are provided to inhibit the action of the counterweight to rotate the rotatable longitudinally extending rail of the center section until the counterweighted outboard sections rotate a predetermined amount, in certain cases sufficiently ot have completed the longitudinal bending of the glass.

A primary object of the present invention is to provide apparatus for bending glass sheets into compound curvatures.

Another object of the present invention is to provide apparatus for bending glass into compound shapes while the latter is conveyed continuously through a bending lehr.

Another object is to provide apparatus for bending glass sheets into compound curvatures wherein the glass is bent along one axis and then along another axis perpendicular to the one axis while being conveyed continuously through a bending lehr.

Still another object of the present invention is to provide apparatus for bending precut glass sheets into shapes having relatively gentle curvatures centrally thereof along the longitudinal axis merging into areas of rapidly increasing curvatures to form opposed end portions in substantially parallel but spaced planes, and wherein one longitudinal side of the glass is bent transversely of the sheet along an axis having a curvature of non-uniform severity.

The present invention will become apparent upon study of the following description of particular embodiments of our invention, wherein the accompanying drawings form a part of the disclosure. The description which follows is for illustration rather than limitation. Reference to the latter may be obtained by study of the claims forming part of this application.

In the drawings,

FIGURE 2 is a frontal perspective view of a typical bending mold employed in the present invention showing the mold in open position for receiving a flat precut sheet of glass such as shown in FIGURE 1.

FIGURE 3 is a perspective view similar to FIGURE 2, showing the mold in its normally closed position forming a continuous skeleton frame conforming in both elevation and outline to the periphery of the bent glass sheet. In FIGURES 2 and 3, certain elements which do not contribute to the bending operation have been omitted for the sake of clarity.

FIGURE 7 is a view similar to FIGURE 6, showing the glass loaded mold after the longitudinal bending has been almost completed but before the transverse bend has commenced.

FIGURE 8 is an enlarged front longitudinal elevation of a portion of the mold, similar to FIGURES 6 and 7, showing the portion after both longitudinal and transverse bending have been completed.

FIGURE 9 is an end elevation of the mold in the open position, partly in perspective.

FIGURE 10 is an end elevation of the mold as in FIGURE 9 after the glass has been bent longitudinally, but before the transverse bend has been started.

FIGURE 11 is an end elevation of the mold as in FIGURE 9 after both longitudinal and transverse bends have been completed.

FIGURE 12 is a cross-sectional view of a sag indicating element useful with bending molds of the present type.

FIGURE 13 is a perspective view of a portion of a mold showing an alternative triggering device for the present invention in the locked position.

FIGURE 14 is a view similar to FIGURE 13, showing the triggering device in the tripped position.

FIGURE 15 is a longitudinal elevation partly in section of a bending lehr showing the location of various tripping mechanisms along the length of the lehr with bending molds shown schematically therein.

FIGURE 16 is a cross-section taken along the lines XVI—XVI of FIGURE 15 with a bending mold shown schematically.

FIGURE 17 is an enlarged detailed elevation of a portion of a lehr taken along the lines XVII—XVII of FIGURE 16, with the bending molds in this section shown schematically.

FIGURES 18 and 19 are detailed fragmentary perspective views of an illustrative embodiment of means inhibiting pivoting of a movable mold element by locking the element in a fixed position, tripping means for moving the inhibiting means out of locking position and actuating means for pivoting said movable mold element according to the present invention.

Figure 1:
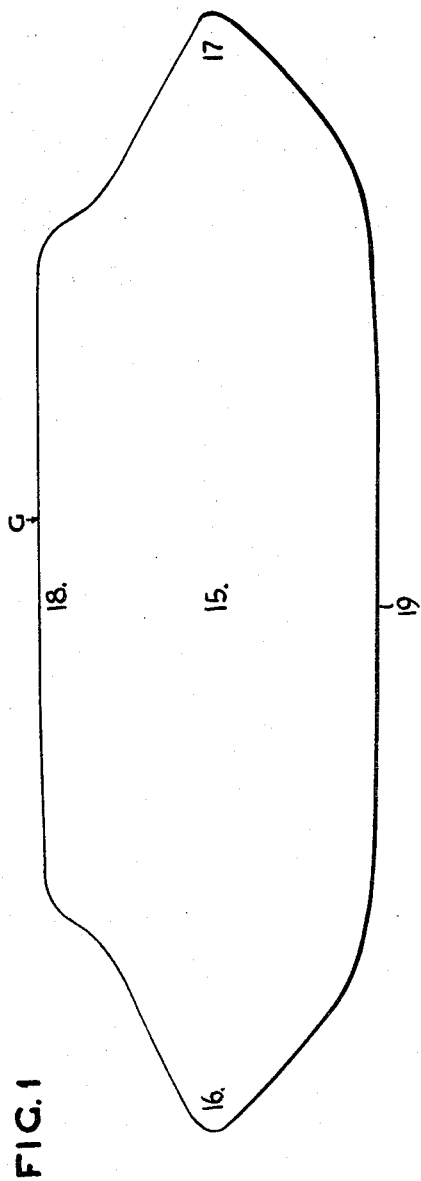
FIGURE 1 is a plan view of a flat sheet of glass precut to the outline desired preparatory to bending.
Figure 4:
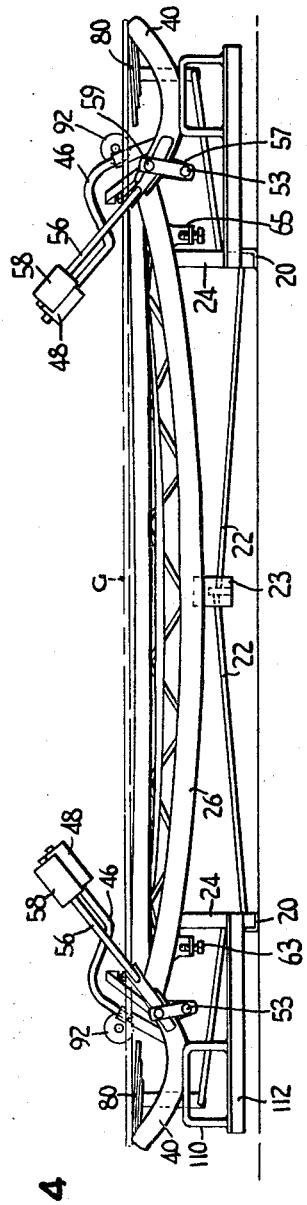
FIGURE 4 is a rear longitudinal elevation, partly in perspective, of the mold of FIGURE 2 loaded with a flat glass sheet precut for bending.
Figure 6:
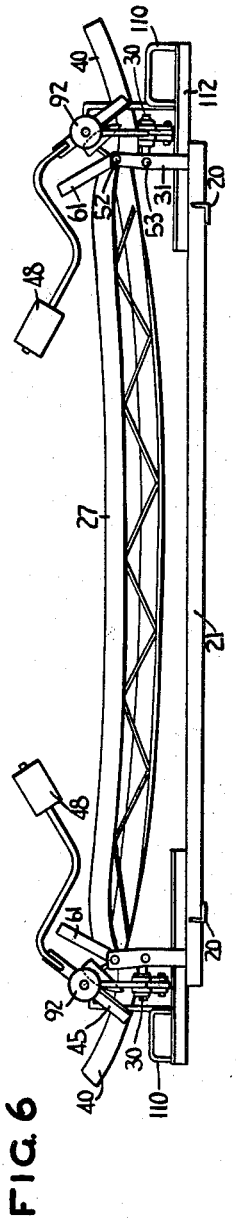
FIGURE 6 is a front longitudinal elevation of the mold opened for receiving a precut glass sheet, partly in perspective.
Figure 5:
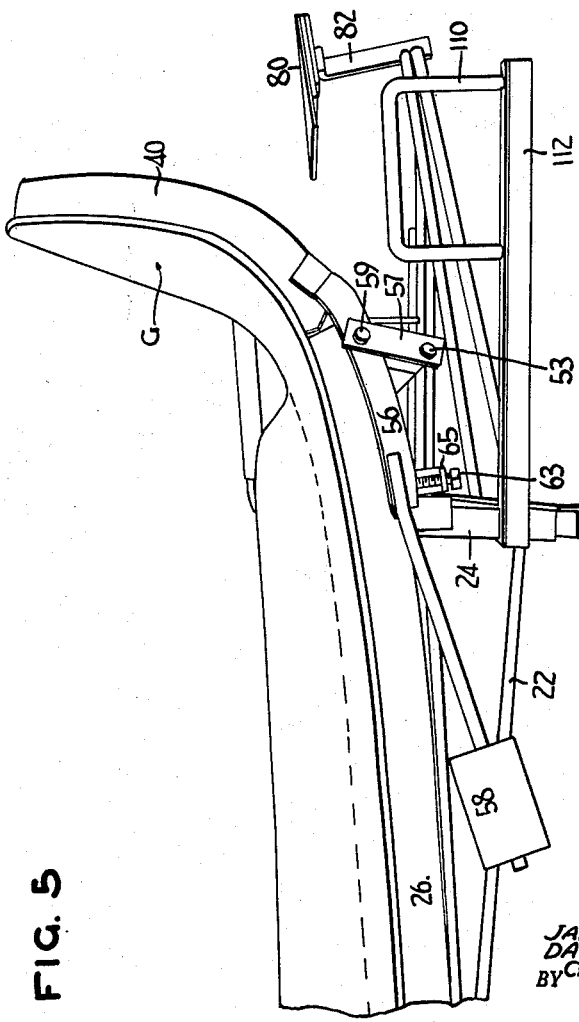
FIGURE 5 is a rear longitudinal elevation of a portion of the mold, as in FIGURE 4, after the glass sheet has been bent on the mold.
Figure 19:
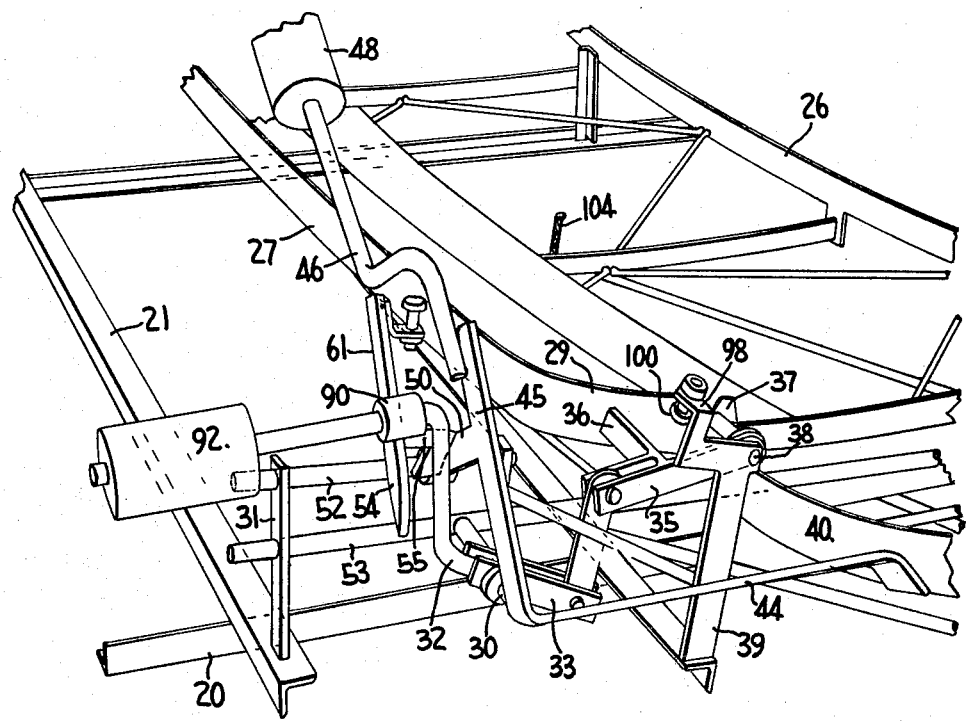

Referring to the drawings, FIGURE 1 shows a typical precut glass sheet G having a main central portion 15 of modified elliptical shape, merging at its longitudinal extremities into wing portions 16 and 17 adapted to be "wrapped around" the sides of an automobile, and an auxiliary portion 18 extending longitudinally along one side of the sheet. The latter portion is bent transversely of the main central portion 15 to extend into the roof of an automobile. The sheet includes another side 19 opposite auxiliary portion 18, which side forms the bottom of the bent panel at the latter is mounted in a vehicle.

Referring to FIGURES 2 through 12, various views of a particular embodiment of apparatus usable to perform the method of our invention are shown. This typical apparatus includes a pair of spaced L-beams 20 extending transversely of the mold, interconnected by a longitudinally extending L-beam 21 and struts 22 interconnecting beams 20 with a support bracket 23 to form a supporting frame for the bending mold. Vertically extending angle irons 24 interconnect cross-beams 20 with a fixed side rail 26 having an upper surface conforming to a portion of the margin desired for a bent glass sheet. Cross bars 28, which are fixed to the supporting frame to form part of its superstructure, extend transversely from adjacent the longitudinal extremities of the fixed side rail 26 to improve the structural rigidity of the mold. Opposing fixed side rail 26 and spaced laterally therefrom is a rotatable rail member 27 provided with opposite longitudinal extremities 29 that are bent laterally of the mold relative to its main portion.

A rod 30 is fixed to the mold support frame at each end thereof by virtue of its connection to a rod 53 rigidly secured to an upright 31 fixed to longitudinally extending L-beam 21. A counterweighted lever arm 32 has a bifurcated extension 33 pivotally attached about rod 30. A floating link 34 is pivoted at one end to the end of the bifurcated extension 33 and at its other end to an additional link 35. The latter, in turn, is pivoted at its other end to a bearing rod 38 rigidly connected to the mold support frame through a support post 39. A T-bar 36 has its stem pivoted to the pivotal connection between floating link 34 and additional link 35, while its cross member rigidly interconnects link 35 to each longitudinal extremity 29 of the rotatable rail 27.

Adjacent the longitudinal extremities 29 of the rotatable rail 27, small fixed rails 37 are located. Each rail 37 is rigidly connected through a bearing rod 38 and support post 39 to the mold support structure. Rails 26, 27 and 37 provide the center section of the bending mold. Rails 26 and 37 are all fixedly attached to the supporting frame whereas rail 27 is hingedly connected thereto by virtue of the connection between the T-bar 36 and additional link 35 about bearing rod 38. The bearing rods 38 thus provide pivot means defining a longitudinal axis extending substantially parallel to rail member 26. Rail 27 is pivotable relative to this pivot means.

At each outboard extremity of the bending mold are provided wing sections 40. These wing sections are substantially C-shaped in contour and contain upper shaping surfaces 42 shaped to the contour desired for the opposing longitudinal extremities of the glass sheet.

At the front side of the bending mold containing the rotatable rail 27, the inboard extremity of each outboard molding section is provided with an angle bar comprising a lateral portion 44 bent into a longitudinal portion 45 extending longitudinally inboard of the bending mold. The longitudinal portion ends in an S-shaped lever arm 46 containing a counterweight 48 at its inboard extremity. The angle bar is braced by means of a bracing rod 49.

A lug 50 extends downwardly from the portion 45. The bottom of the lug 50 is apertured to receive a bearing rod 52, fixed to the upright 31 of the supporting frame to provide a bearing for rotation of the lug 50 about the bearing rod. Upright 31 is also connected to a thin transverse connector rod 53. A cam 54 is attached to lug 50 by a stud 55.

At the rear side of the mold containing the fixed center section rail 26, arms 56 extend longitudinally inboard from their places of attachment to the outboard mold sections 40. Apertured lugs 57 extend upwardly from the opposite end of the transverse connector rod 53 held by lug 31. Counterweights 58 may be attached to the inboard extremities of arms 56.

Counterweighted arm 56 is rotatable about stub bearing 59 carried by lug 57. The stub bearing is aligned with hinge rod 52 to provide an axis of rotation for each outboard mold member 40 and its attached cam 54 relative to the center molding section fixed to the mold. The counterweights 48 and 58 urge the outboard mold members into a closed mold position. A stop bar 61 prevents the outboard members 40 from rotating beyond their desired rotation by abutment by stud 55. At the rear, set screws 63 are adjustable in apertured flanged tabs 65 to enable arms 56 to contact the upper extremity of set screw 63 simultaneously with the engagement of stud 55 with stop bar 61, thus improving the rigidity of the mold in closed position.

In order to enhance the selective heating of the different portions of the glass sheet mounted for bending the glass to extremely severe transverse curvatures, a longitudinally extending sheet of heat reflective material 60 may be provided as part of the superstructure of the supporting frame and is located between center section rails 26 and 27 and below the mold to underlie a longitudinally extending area of the glass sheet supported on the mold. Sheet 60 may be attached to a recessed central cross-rod 62 and to some of the reinforcement braces 66 which form part of the mold supporting frame as well as cross bars 28. Also, additional plates 70 of heat reflective material may be secured to the rotatable rail 27 to enhance the heat applied to the region of the glass sheet to be bent transversely. These sheets may have their upper surfaces slightly concavely shaped transversely of the mold to enhance the desired effect.

This additional differential soaking effect also may be produced by mounting electrical heating elements on the bending mold in the vicinity of the longitudinally extending area to be bent transversely. Such electrical elements are in the form of coils attached to electrodes or shoes. These shoes contact bus bars within the lehr as the molds pass through the lehr, as described specifically in a copending application of James S. Golightly and Harold E. McKelvey, Serial No. 531,462, filed August 30, 1955, now abandoned, to provide additional localized heating causing the localized glass portions to bend transversely. A combination of judiciously placed reflector plates and electrical heating elements may also be used to provide the compound bending effect required.

Heat abstractor plates 80 are optionally secured to the supporting frame for the fixed center rail 26 by means of vertical posts 82 and rods 84, 86 and 88 which interconnect the bottom of posts 82 with either cross beams 20 or vertically extending angle irons 24. The heat abstractor plates 80 underlie the outboard sections of the mold when the latter are rotated into an open mold position. Their purpose is to abstract heat reradiated by the longitudinal extremities of glass sheets mounted for bending on the mold, thus preventing undue curling of the glass at its longitudinal extremities.

In order to receive flat glass sheets preparatory to mounting, it is necessary that the outboard mold sections 40 be rotated into their outward positions. Counterweighted lever arms 32 are provided with a roller 90 and a counterweight 92. Thus, by lifting the counterweights 92, floating links 34 and crank arms 35 move the angled connector rods 36 in such a manner that rail member 27 is rotated into a lowered position. Rotation of the outboard members 40 to a spread position causes cams 54 to move into position beneath the lifted rollers 90 mounted on the counterweighted lever arm 32. Thus, the mold may be opened and locked transversely. The cams 54 and the counterweighted lever arms 32 thus constitute cooperating cam members that behave as inhibiting means to prevent rotation of rail member 27 from its lowered position for supporting the flat glass sheet to its upper position to support the bent glass sheet.

One or more flat glass sheets precut to the outline desired for the finally bent sheet are laid on the open mold and are supported at their longitudinal extremities 16 and 17 by the outboard extremity of the outboard sections 40, at their side extremity 19 by the longitudinal extremities of the upper shaping surface of rail 26, and at their side extremity 18 by the downwardly rotated rail 27 and the small fixed rails 37. The glass laden mold is then conveyed into a bending lehr, where the glass and the mold are soaked with heat to bring them to glass softening temperatures. The rotational moments provided by the counterweights 48 and 58 lift the outboard wing sections 40 whenever the glass is softened sufficiently so that its resistance to this rotational action is decreased because of the decreasing viscosity of the glass as its temperature rises.

As the wing members rotate from the open to the closed position, cams 54 move toward the center of the mold. At the moment the longitudinal bend is substantially completed, cams 54 are rotated out of or disconnected from supporting engagement with rollers 90. When the latter are no longer supported by cams 54, counterweighted lever arms 32 operate through their linkages 34, 35 to lift rotatable rail 27, thus raising the rail-supported, heat-softened side extremity 18 of the glass. Lever arms 32 may be interconnected, for example, by a connector bar 32′ depicted in phantom in FIGURE 2, so that both cams must be removed from contact with rollers 90 before counterweights 92 can bear their moments of force on the glass. This eliminates any warpage of rail member 27 because of the imposition of unequal forces by the counterweights at different positions thereof, and any lack of constancy in the transverse bend that would result from one end of the softened portion 18 being subjected to mechanical lifting before the other.

As stated previously, overbending of the wing members 40 relative to the fixed rails 26 and 36 is prevented by the engagement of stud 55 with stop member 61, and the simultaneous engagement of arm 56 with set screw 63. Similarly, excessive rotation of the rotatable rail member 27 is prevented by means of a stop member 96 comprising an apertured lug 98 through which is screw threaded a set screw 100. Stop member 96 is supported by post 39, which also supports pivot rod 38. When rotatable rail section 27 has been rotated the desired amount, additional link 35 contacts the bottom surface of set screw 100, thus preventing further rotation.

Another feature of our apparatus that may be included is a sag indicating means exemplified by a vertical finger 104 (FIGURE 12), which extends upwardly from the depressed center cross rod 62 within the outline of the mold to a height designed to touch the glass when the latter sags. Finger 104 comprises a metal rod 106 fixed securely at its bottom to cross rod 62 and a sleeve 108 of flexible refractory material such as a fiber glass product fixed to the rod and having its upper half inch extending beyond the rod to the elevation conforming to that desired for the sagged central portion of the glass sheet. The flexible refractory material is positioned intermediate rails 26 and 27 and below their shaping surfaces to face the undersurface of a supported glass sheet and is capable of deflecting when contacted by a sagged portion of the glass sheet, thereby indicating the amount of sage developed in the glass sheet.

Best results are obtained for extremely severe compound curvatures when the longitudinal bend is completed before the mechanical force is applied to aid the transverse bend, since glass is difficult to stretch in two directions simultaneously. However, if the glass is maintained at its elevated temperature beyond the time required for the bending to be accomplished, an unwanted sag is imparted to the glass. The provision of the fingers 104 enables operators to view the progress of the longitudinal bend through windows disposed along the side walls of the bending lehr.

The position of the undersurface of the glass relative to the fingers indicates the proper time for the transverse bend to commence. Experience determines the optimum position in the lehr for this to take place. Thus, if the finger sleeve 108 is deflected to indicate the glass is sagging too rapidly, the rate of bending may be decreased. Conversely, the bending rate may be increased whenever the sleeve 108 indicates that the bend has not progressed sufficiently.

A handle 110 is provided at each corner of the bending mold to facilitate handling, either by the personnel working in the bending department or by automatic handling equipment. Each handle 110 may comprise a U-shape pipe or rod fixed at its extremities to an angle iron 112 extending outwardly of the cross beams 20.

In the embodiment described above, the cams 54 are engageable with the rollers 90 of the counterweighted lever arms 32 to provide inhibiting means in operative connection to the pivotable rail 27 through elements 32 to 36, inclusive, to prevent rotation of said pivotable rail 27 about bearing rods 38 by locking rail member 27 in a fixed position, the weights 48 and 58, attached to the wing sections 40 and to the cam 54, provide tripping means for moving the inhibiting means out of operative connection with the pivotable rail member 27, and the weights 92 operating through weight arms 32, floating links 34, additional links 35 and T-bars 36, serve as actuating or urging means to rotate pivotable rail 27 about the longitudinal axis provided by bearing rods 38 when the inhibiting means is out of operative connection with the pivotable rail 27.

Referring specifically to FIGURES 13 and 14, an alternate construction of inhibiting means, tripping means and actuating or urging means is disclosed. This alternate construction includes a bifurcated hinge arm 120 fixed to the leading longitudinally extending L-beam 21 of the mold support frame and a hinge rod 122 connecting the bifurcated ends. Oblique arms 124 fix the hinge rod to the substructure of the support frame. A freely pivotable latch 126 is mounted for rotation about hinge rod 122. An eye 128 of formed steel is attached as by welding to the bottom of rotatable rail member 27. Normally, latch 126 engages eye 128 to serve as a means inhibiting rotation of rail member 27. However, when the latch is caused to rotate out of engagement with eye 128, rail member 27 is free to rotate in response to the urging of the counterweights 92 to cause the transverse bend in the glass.

The operation of a typical mold provided with the hook and latch depicted in FIGURES 13 and 14 will be better understood by studying FIGURES 15 through 17. These figures depict a typical bending lehr 130 provided with a preheat section 132, a longitudinal bending section 134, a transverse bending section 136 and an annealing section 138. The lehr has an entrance 140 at the beginning of its preheat section and an exit 142 at the exit end of its annealing section. Conveyor rolls 143 are rotated about axes transverse of the lehr to move the molds M through the lehr.

Electrical heaters 144 are mounted above the passage for the molds and are provided with electrical energy from a voltage source (not shown). The electrical input and the location of each heater 144 relative to the moving glass sheets may be adjusted so as to vary the heat imparted into localized regions across their longitudinal dimension to help provide the complex longitudinal bend desired. The molds M are conveyed sidewise through the lehr along the conveyor rolls 143.

In the transverse bending section 136, a number of vertically adjustable lugs 146 are provided. These lugs are spaced longitudinally of the lehr between conveyor rolls 143 and are aligned axially. Each lug 146 is fixed to a rotatable rod 148 extending through and supported by bearing brackets 150. Bearing rod 148 is bent to form an arm 151 provided with a counterweight 152. The latter causes the lug 146 to rotate from an oblique position to a vertical position. A stop pin 154 slidable in a recess 156 prevents the counterweight 152 from causing lug 146 to be rotated into its vertical position when the stop pin 154 is moved outwardly beneath the counterweighted arm 151.

Lug 146 is so dimensioned that when counterweighted arm 151 is supported by the stop pin 154, both the mold carriage and the bottom of the latch 126 clear the lug. However, when stop pin 154 is pushed into the recess 156 to disengage the counterweighted arm 151, thus causing lug 146 to be rotated to its vertical position, lug 146 is met by the bottom of latch 126 upon movement of the mold through the lehr. The moment provided by counterweight 152, while sufficiently large to rotate lug 146 into its vertical position, is insufficient to prevent counterrotation of the lug 146 upon abutment by portions of the rigid mold supporting frame as the latter pass through the transverse bending portion of the lehr.

Windows 155 are provided along the length of the lehr to insure sufficient opportunity for observing the glass bending cycle. The particular location at which the latch 126 is tripped may be selected from any one of the locations possible merely by selecting a particular stop pin 154 to actuate the proper lug 146. This optimum location depends upon the particular pattern of the glass to be bent, the heating configuration within the bending lehr, and the speed of mold movement through the lehr, which determine the rate of bending.

For a particular example wherein the sheet of FIGURE 1 is to be bent so that its wing portions 16 and 17 are to be bent sharply longitudinally of the sheet and the auxiliary portion 18 is to be bent sharply transversely of the sheet, the heating pattern imparted to the various sections of the lehr is important. In the preheat section 132, each row of heaters extending transversely of the longitudinal axis of the movement of the glass is heated to impart a uniform transverse temperature pattern to the glass and mold passing therebeneath. Each succeeding row of heaters in the preheat section imparts heat at a higher intensity to the passing glass and mold.

In the longitudinal bending section 134, the heaters 144 are energized in a different pattern. The heaters in each row are energized to different intensities so that the column of heaters overlying those regions of glass destined for severe curvatures are energized to higher voltages than the other heaters in this lehr section. The heat intensity pattern intersected by the glass sheets in their lateral movement through lehr section 134 comprises two spaced regions of high intensity separated by a region of relatively moderate intensity. The bending moments resulting from the mechanical forces of the counterweighted outboard molding members 40 on the glass act locally on the strips of glass passing beneath the columns of high intensity heaters, thus helping to impart the severe curvature in the proper locations along the longitudinal bend.

In the transverse bending section 136, the intensity pattern across the rows of heaters 144 is more uniform than in the longitudinal bending section. In this section, the rotation of the rail member 27 imparts the localized transverse curvature to the glass, which is still in the region of glass softening temperatures.

In the embodiment depicted in FIGS. 12 to 17, the upper end of latch 126 cooperates with eye 128 to serve as alternative inhibiting means operatively connected to pivotable rail 27, the selected lug cooperates with the bottom end of latch 126 to provide alternative tripping means for moving the alternative inhibiting means out of operative connection with pivotable rail 27 and counterweights 92 serve as actuating or urging means to rotate the pivotable rail 27. The tripping means in this latter embodiment is manually operated through the control exercised by the position of stop pins 154 relative to arms 151.

For practical purposes, the longitudinal bending section 134 and the transverse bending section 136 may be combined in a single lehr section wherein both bends may be performed simultaneously. This is especially true when the precut glass is shaped in the manner described in copending application Serial No. 527,536 of Ewell C. Miles, filed August 10, 1955, now Patent No. 2,924,485, issued on February 6, 1960.

In the annealing section 138, each row of heaters is heated in such a manner as to equalize the temperature throughout the glass sheet and to provide for cooling of the glass as it proceeds through this section. Such an intensity pattern ned not be uniform across any row of heaters.

Once the transverse bend is completed as viewed through the lehr windows, the molds may be accelerated toward the annealing section by coupling high speed motors to the desired conveyor rolls by means of selective clutches (not shown). However, when the lehr is adjusted properly and a large batch of sheets is to be bent to a particular shape, the molds are conveyed through the lehr at a constant speed.

The present application is a continuation of application Serial No. 531,461, filed August 30, 1955, now abandoned.

What is claimed is:

1. A device for shaping glass sheets into compound curvatures including a longitudinal bend of non-uniform curvature and a transverse bend of non-uniform curvature comprising a support structure, a skeletonized mold, having an upper shaping surface, operatively associated with said support structure, said mold comprising an elongated rail fixed to said support structure and having an upper shaping surface, a pair of longitudinally spaced hinges mounted on said support structure and spaced from said upper shaping surface, a first rail member rotatably mounted on said hinges, outboard molding members rotatable about spaced axes angularly disposed relative to the axis defined by said hinges, a fixed rail member at either longitudinal extremity of the first rail member, and means urging said first rail member to rotate from a relatively low position spaced from said elongated rail to a relatively high position closer to said elongated rail.

2. Apparatus as in claim 1, including inhibiting means mounted on said mold and movable into operative connection with said first rail member to inhibit rotation of said first rail member and tripping means operatively connected to said inhibiting means to move said inhibiting means out of operative connection with said first rail member.

3. A device as in claim 1, further including a longitudinally extending sheet of heat reflective material attached to said support structure and located between said first rail member and said elongated rail and below the upper shaping surfaces of said first rail member and said elongated rail.

4. Apparatus for bending glass sheets into compound curves including a longitudinal bend of non-uniform curvature and a transverse bend of non-uniform curvature, said apparatus comprising a support structure, a skeletonized mold comprising a center mold section including a pair of spaced rails provided with upper shaping surfaces, one of said spaced rails being rigidly supported by said support structure, the other of said spaced rails being pivoted to said support structure for rotation about an axis substantially parallel to said one rail, a pair of outboard molding members having upper shaping surfaces hinged to said support structure for rotation about axes angularly disposed to the axis of rotation of said other spaced rail, means attached to said outboard molding members for urging said outboard molding members to rotate from a flat glass supporting position to a closed mold position, inhibiting means mounted on said mold and operatively connected to said pivoted spaced rail to prevent rotation of said pivoted rail, tripping means operatively connected to said inhibiting means for moving said inhibiting means out of operative connection with said pivoted rail, and actuating means connected to said pivoted rail for pivoting said pivoted rail when the inhibiting means is out of operative connection with said pivoted rail.

5. Apparatus as in claim 4, wherein the tripping means comprises a manually operated lug.

6. Apparatus as in claim 4, wherein the tripping means comprise a disconnected cam connected to each said outboard molding members.

7. Apparatus as in claim 4, further including a longitudinally extending sheet of heat reflective material attached to said support structure and located between said spaced rails and below the upper shaping surfaces of said spaced rails.

8. Apparatus as in claim 4, including sag indicating means attached to and extending upwardly from said support structure, the uppermost portion of said sag indicating means comprising a flexible refractory member positioned intermediate said spaced rails and below their shaping surfaces so as to face the undersurface of a glass sheet supported on said mold and be deflected upon contact by a sagged portion of the glass sheet.

9. Apparatus for bending glass sheets comprising a support structure, and a mold of skeleton outline supported by said support structure, said mold comprising a pair of spaced rails having upper shaping surfaces, and sag indicating means attached to and extending upwardly from said support structure, the uppermost portion of said sag indicating means comprising a flexible refractory member positioned intermediate said spaced rails and below their shaping surfaces so as to face the undersurface of a glass sheet supported on said mold and be deflected upon contact by a sagged portion of the glass sheet.

10. Apparatus as in claim 9, further including a longitudinally extending sheet of heat reflective material attached to said support structure and located between said spaced rails and below the upper shaping surfaces of said spaced rails.

11. In apparatus for bending glass sheets comprising a sectionalized bending mold including rails having upper shaping surfaces and comprising a pivotable rail pivotable between a flat glass supporting position and a bent glass supporting position, the improvement comprising inhibiting means mounted on said mold and operatively connected to said pivotable rail to prevent rotation of said pivotable rail from said flat glass supporting position, tripping means operatively connected to said inhibiting means for moving said inhibiting means out of operative connection with said pivotable rail, and actuating means connected to said pivotable rail for pivoting said pivotable rail when the inhibiting means is out of operative connecton with said pivotable rail.

12. Apparatus as in claim 11, wherein the tripping means comprises a manually operated lug.

13. Apparatus for bending glass sheets into compound bends including a longitudinal bend of non-uniform severity and a transverse bend of non-uniform severity comprising a bending mold having an upper shaping surface for supporting a flat glass sheet during exposure to glass softening temperature, means operatively associated with said mold for applying force to the longitudinal extremities of the heat softened glass sheet to impart a longitudinal bend to the sheet, means operatively associated with said mold for applying force to one side portion of the heat softened glass sheet to impart a transverse bend to the sheet and means operatively associated with said last named means to inhibit operation of said last named means until after substantial completion of the operation of the first named means.

14. Apparatus for shaping glass sheets into compound curvatures including a longitudinal bend of non-uniform curvative and a transverse bend of non-uniform curvature comprising a support structure, a skeletonized mold comprising a center mold section supported by said support structure, said center mold section comprising a pair of longitudinally extending rails laterally spaced one from the other, said mold further comprising a pair of outboard molding members hinged to said support structure for rotation about axes angularly disposed relative to the longitudinal extent of said center section rails, said rails and said outboard molding members having upper shaping surfaces, means attached to said outboard molding members for urging said outboard molding members to rotate from a flat glass supporting position to a closed mold position, wherein each of said upper shaping surfaces of said rails and of said outboard molding members forms a different part of an outline shaping surface for said mold in said closed mold position, and a longitudinally extending sheet of heat reflective material attached to said support structure and located between said laterally spaced rails comprising said center section and below the upper shaping surfaces of said spaced rails in position to underlie a longitudinal area of a glass sheet supported on the skeletonized mold.

15. Apparatus as in claim 14, wherein said longitudinally extending sheet of heat reflective material has an upper surface of concave shape transversely of the mold and positioned to face the portion of the glass sheet supported on the mold that is to be bent about an axis extending longitudinally of the glass sheet.

References Cited in the file of this patent

UNITED STATES PATENTS

| | | |
|---|---|---|
| 2,330,349 | Galey | Sept. 28, 1943 |
| 2,452,488 | Paddock et al. | Oct. 26, 1948 |
| 2,551,606 | Jendrisak | May 8, 1951 |
| 2,691,854 | Rugg | Oct. 19, 1954 |